United States Patent [19]

Hintz et al.

[11] 4,012,970
[45] Mar. 22, 1977

[54] METHOD OF FORMING A WOOD BORING TOOL

[76] Inventors: Doran M. Hintz, Rte. 1, Box 230-L; Lief H. Steinberger, Rte. 1, Box 231-A, both of Oroville, Calif. 95965

[22] Filed: Apr. 19, 1976

[21] Appl. No.: 678,165

[52] U.S. Cl. .................. 76/102; 29/428; 29/558; 145/116 R; 408/173
[51] Int. Cl.² .......................... B21K 5/02
[58] Field of Search ............ 29/558, 428, 103; 76/102, 101 A; 145/116; 408/173

[56] References Cited

UNITED STATES PATENTS

| 222,970 | 12/1879 | Wenchel | 76/101 A UX |
| 1,492,803 | 5/1924 | Koeln | 76/101 A |
| 2,418,320 | 4/1947 | Simmons | 76/101 A |
| 2,483,220 | 9/1949 | Morrow | 76/101 A X |
| 2,883,888 | 4/1959 | Stewart | 76/102 |
| 3,491,422 | 1/1970 | Kelly et al. | 76/101 A X |

FOREIGN PATENTS OR APPLICATIONS 952,484  11/1949  France ............ 76/101 A

Primary Examiner—Charlie T. Moon
Attorney, Agent, or Firm—Gerald L. Moore

[57] ABSTRACT

A boring tool for woodworking, and more particularly, a method of manufacturing the cutter head from a blank of cylindrical tool steel bar stock. The opposite ends of the cylindrical blank are turned to the desired radius for the cutter head, a transverse internally threaded recess is provided along a diameter of the blank at its mid-length, and the blank is machined to provide a central hub surrounding the recess with oppositely directed radial arms extending therefrom. The surface of the blank opposite the recess is faced to provide cutting edges, and a shank and lead screw are fixed in the recess.

3 Claims, 7 Drawing Figures

METHOD OF FORMING A WOOD BORING TOOL

BACKGROUND OF THE INVENTION

Boring tools consisting of a cutter head attached to an elongated shank are well known in the woodworking art. Heretofore the cutter heads used today have been fabricated from several parts which are stamped or machined from different materials and then assembled together by suitable processes such as by welding. The cutter heads so produced have been effective, but have been expensive to manufacture. The manufacturing process has involved a number of diverse steps, such as stamping, bending, welding, machining, boring, etc., as well as a number of different machines and jigs to produce and assemble the various parts. The process has thus been complicated and time consuming and the resultant product has been quite expensive. This shortcoming of the prior known devices has been overcome in the present invention by provision of a process of manufacturing a cutter head for boring tools by machining from a single blank of cylindrical bar stock.

DESCRIPTION OF THE INVENTION

Figure 1:
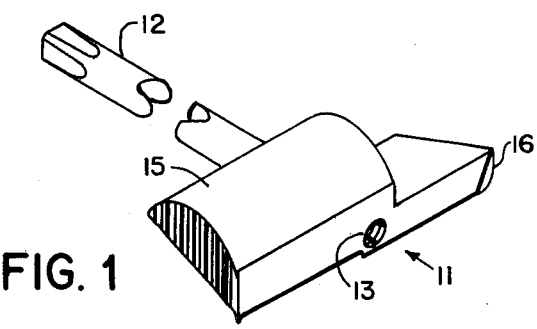
FIG. 1 is a perspective view of a boring tool of the present invention.
Figure 2:
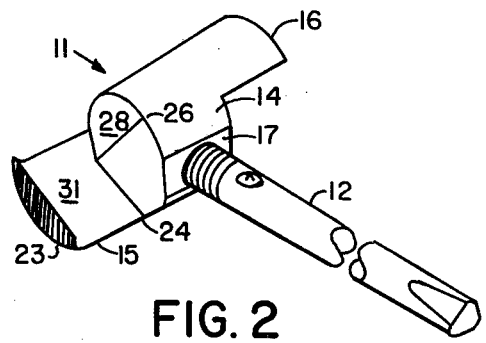
FIG. 2 is another view in perspective of a boring tool of the present invention.

Referring more particularly to FIGS. 1 and 2 of the drawing the boring tool of the present invention includes a cutter head 11, shank 12 and a lead screw receiving opening 13. The cutter head is machined from a single piece of cylindrical tool steel bar stock and includes a central hub 14 and two oppositely directed arms 15 and 16. The upper surface 17 of the cutter head is machined flat and provided with an internally threaded recess 18 (FIGS. 4 and 5) which is adapted to receive the externally threaded end of the shank 12. An opening 13 having a somewhat smaller diameter than that of the recess 18, but coaxial therewith, extends from the bottom of the recess 18 to the lower surface of the cutter head. A similar opening 21 is drilled into the externally threaded end of the shank in position for alignment with opening 13. The lead screw 19 is an elongated rod with a tapered, externally threaded tip and is positioned in openings 13 and 21 and then locked in place by means of a set screw 22 such that the externally threaded tip protrudes below the lower surface of the cutter head.

The distal ends of the arms 15 and 16 are turned to a radius about the center line of the opening 13 and then externally threaded as shown at 23. The pitch of the threads 23 is the same as the pitch of the threads on the externally threaded tip of the lead screw. The function of the lead screw is to guide the cutting edges of the cutter head into the work as the cutter head is rotated by the shank. Inasmuch as the threads of the lead screw sometimes become stripped under working conditions, the threads 23 on the distal ends of the arms 15 and 16 are provided to engage the sides of the opening being drilled into the workpiece and similarly draw the cutting edges into engagement with the workpiece as the cutter head is rotated. The threads 23 thus add to the effect of the lead screw and will provide a drawing or feeding action alone when the threads of the lead screw become stripped.

Figure 4:
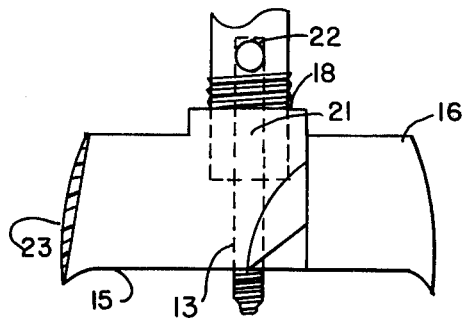
FIG. 4 is a side view of the cutter head.
Figure 6:
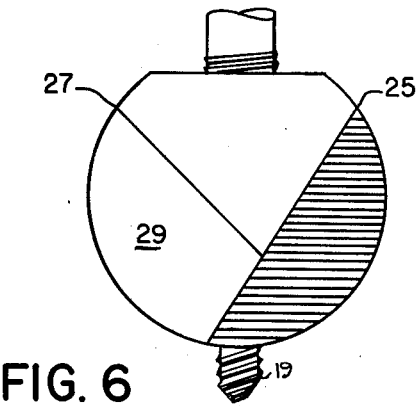
FIG. 6 is an end view of the cutter head.
Figure 3:
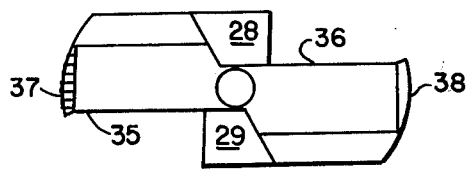
FIG. 3 is an elevation view of the bottom surface of the cutter head of FIGS. 1 and 2.
Figure 7:
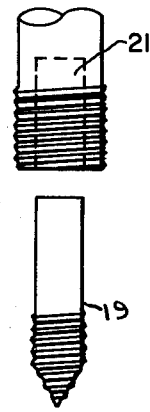
FIG. 7 is a partial view in elevation of the shank and lead screw of the present invention.
Figure 5:
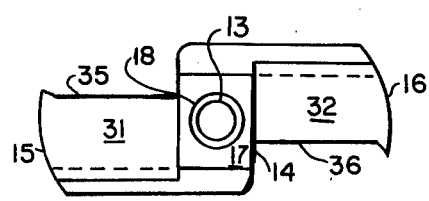
FIG. 5 is a top view of the cutter head.

The radially extending arms 15 and 16 are formed by machining away portions of the cylindrical bar stock from which the cutter head is made. As indicated in FIGS. 3, 4 and 6, arm 15 is formed by machining the cylindrical blank from one side to a depth defined by a chord 24 (FIG. 2) which lies tangent to opening 13 at the lower surface of the head and extends approximately 30° clockwise from the axis at the shank. The arm is machined inwardly from the distal end toward the recess 18 to define the hub 14. The lower edge of the hub is then machined away beginning at line 26 along plane 28 which extends at an angle of approximately 45° to the axis of the shank to approximately the midpoint of the opening 13. The arm 15 is thus provided with a smooth lifting surface 31 having a straight lower edge aligned tangentially to the opening 13 and extending from the lead screw to the distal end of the arm. The blank is then reversed and arm 16 is formed by machining away the material of the blank from the opposite surface to a depth defined by a chord 25 (FIG. 6) which lies tangent to opening 13 at the lower surface of the head and extends approximately 30° counter-clockwise from the axis of the shank. The lower edge of the hub is machined from the line 27 along a plane 29 to approximately the midpoint of the opening 13. The result as shown in FIGS. 5 and 6 is to produce an oppositely directed lifting surface 32 with a lower surface aligned tangentially to opening 13 and extending from the lead screw to the distal end of the arm. After the arms 15 and 16 are formed, the lower surfaces of the cutter head are machined to form flat surfaces 33 and 34 which intersect the surfaces 31 and 32 to provide the oppositely directed cutting edges 35 and 36. The surfaces 33 and 34 are oppositely directed and are slightly less than normal to the axis of the opening 13 to provide the necessary cutting relief for the blades or cutting edges of the head. In addition the surfaces 33 and 34 stop short of the distal ends of the arms to provide grooving spurs 37 and 38 at the distal edges of the respective arms.

The lifting surfaces 31 and 32 lift the chips and shavings from the surface of the workpiece as the cutter head is rotated, while the grooving spurs define the peripheral boundary of the work area to be removed by the cutting edges.

The planes 28 and 29 facilitate the extension of the cutting edges 35 and 36 into the center of rotation of the cutter head, i.e., the opening 13. This permits the cutting edges to address the entire surface of the work area. Since the cutting edges are tangent to the opening 13 ahead of, with respect to the direction of rotation of the cutter head, a diameter through the axis of rotation of the head, the cutting action is slightly oblique to the cutting edges which appreciably enhances the paring action of the edges.

From the foregoing description taken in connection with the accompanying drawings the advantages of the present boring and the method of its production will be readily understood to those skilled in the art to which the invention appertains. While we have described the principal production method and use of a form of our invention which we now consider to comprise a preferred embodiment thereof, we desire to have it understood that the showing is primarily illustrative and that such changes and developments may be made when desired as fall within the scope of the following claims.

We claim:

1. The method of forming a wood boring tool comprising the steps of providing a short blank of cylindrical tool steel bar stock, drilling an opening along a diameter of the cylindrical bar stock at its approximate mid-length, turning the opposite ends of the blank to a desired radius about the axis of the opening, machining away the opposite ends of the blank to form two oppositely directed radially extending arms having smooth lifting surfaces lying on chords of the cylinder which are oppositely directed and extend at approximately 30° from the axis of the opening, and facing the lower edges of the surfaces to provide oppositely directed cutting edges tangential to the opening.

2. The method as defined in claim 1 including the step of inserting a lead screw in the opening with an externally threaded portion extending below the cutting edges.

3. The method as defined in claim 2 including the step of providing in the surface of the blank removed from the cutting edges an enlarged internally threaded recess which is coaxial with the opening.

* * * * *